United States Patent [19]

Narita et al.

[11] 4,151,683
[45] May 1, 1979

[54] DOOR FOR VEHICLE, ESPECIALLY PASSENGER MOTOR VEHICLE

[75] Inventors: Ryuhei Narita, Tokyo; Eiji Yagi; Kenzo Hirashima, both of Yokohama; Takashi Oka, Yokosuka, all of Japan

[73] Assignee: Nissan Motor Company, Limited, Japan

[21] Appl. No.: 912,764

[22] Filed: Jun. 5, 1978

[30] Foreign Application Priority Data

Jul. 12, 1977 [JP] Japan .................................. 52-83766

[51] Int. Cl.² ............................................... B60J 5/04
[52] U.S. Cl. .......................................... 49/502; 49/350; 49/351; 49/353
[58] Field of Search ................. 49/348, 350, 351, 353, 49/502

[56] References Cited

U.S. PATENT DOCUMENTS

| | | | |
|---|---|---|---|
| 3,247,616 | 4/1966 | Peras | 49/351 X |
| 3,541,732 | 11/1970 | Hanson | 49/348 X |
| 3,897,652 | 8/1975 | Hess | 49/351 |
| 3,964,208 | 6/1976 | Renner et al. | 49/502 |

*Primary Examiner*—Philip C. Kannan
*Attorney, Agent, or Firm*—Lane, Aitken & Ziems

[57] ABSTRACT

A door for vehicles which includes an outer door panel and an inner door panel and is equipped with a window regulator unit. The inner panel is formed with an attachment recess for a window glass regulator unit and a slit. The window regulator unit is attached to the bottom of the attachment recess and has a window regulator arm or connecting pin extending through the slit into a space between the outer and inner panels for operative connection with an attachment plate fixed to the door glass, the connecting pin interconnecting the door glass and the window regulator arm.

8 Claims, 16 Drawing Figures

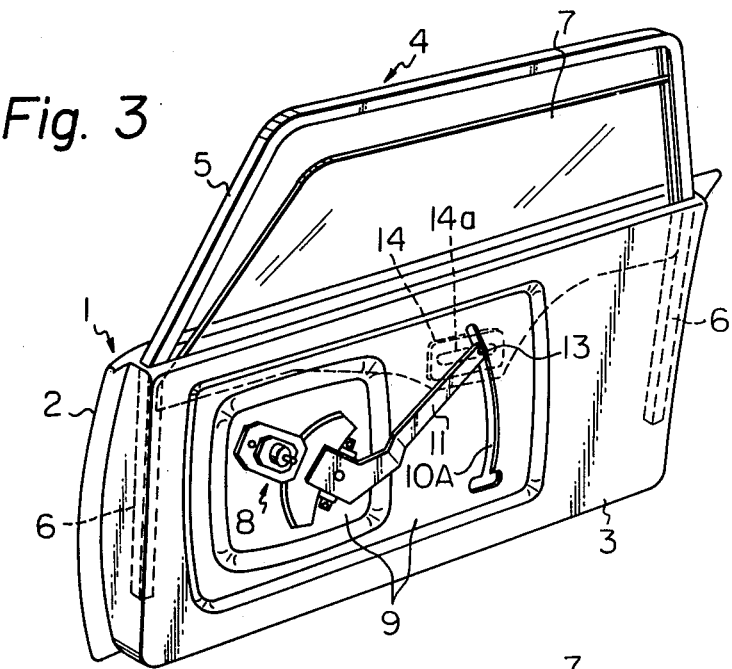
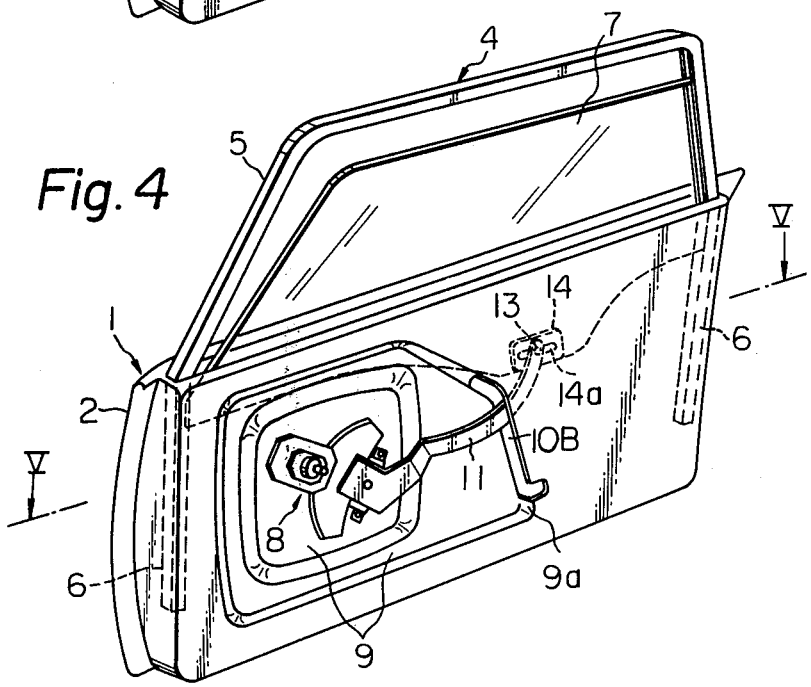

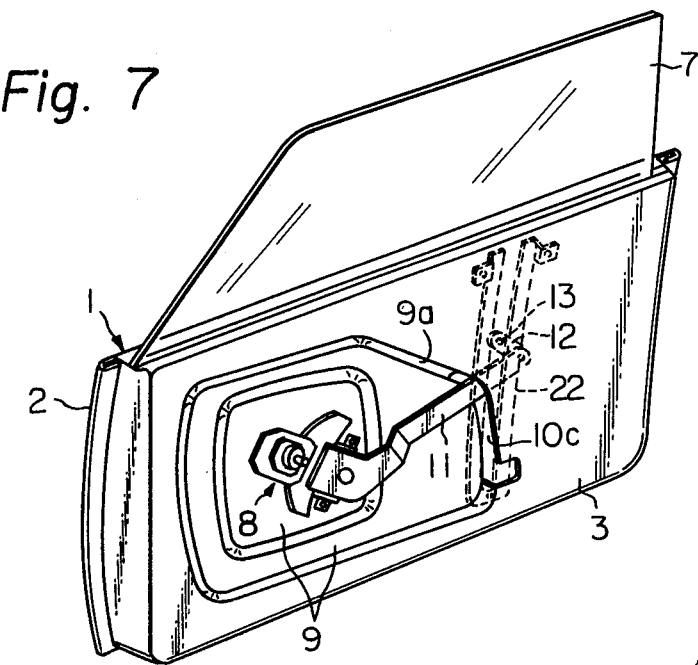
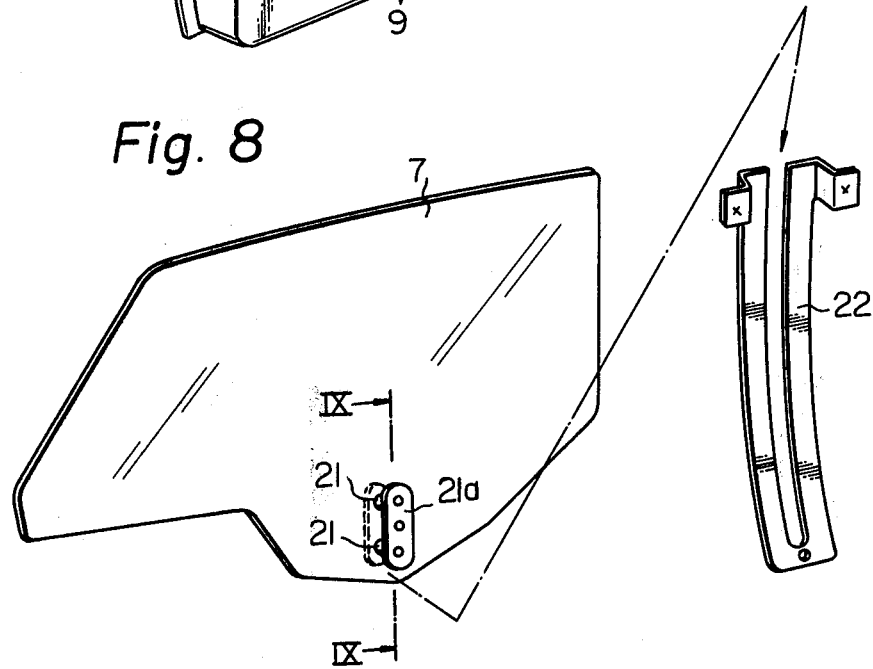

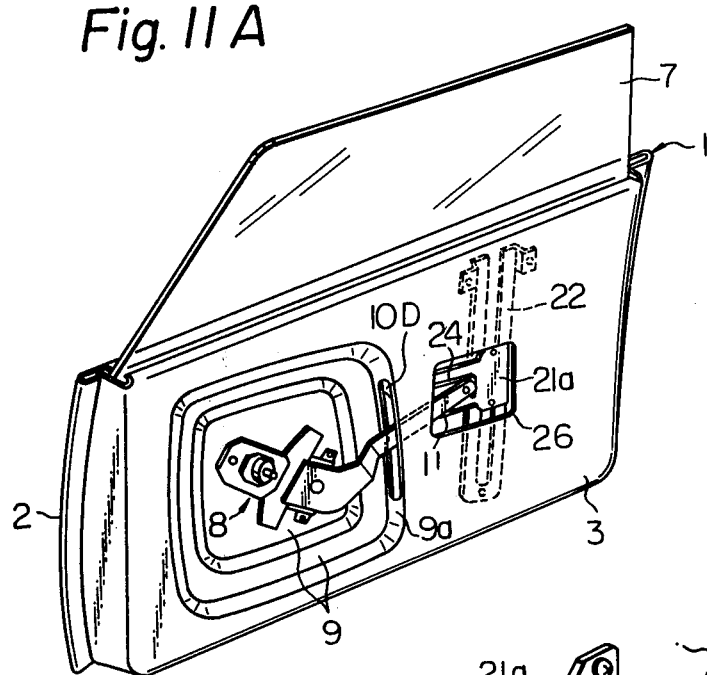
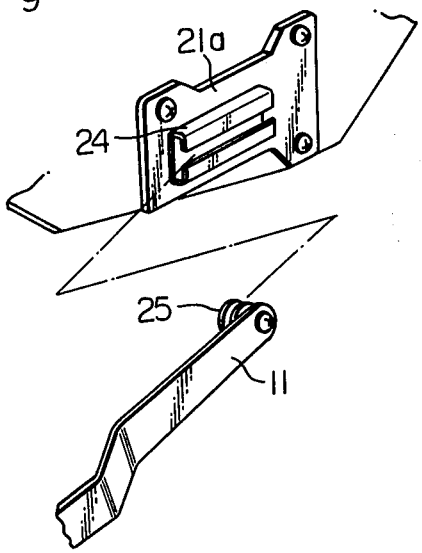

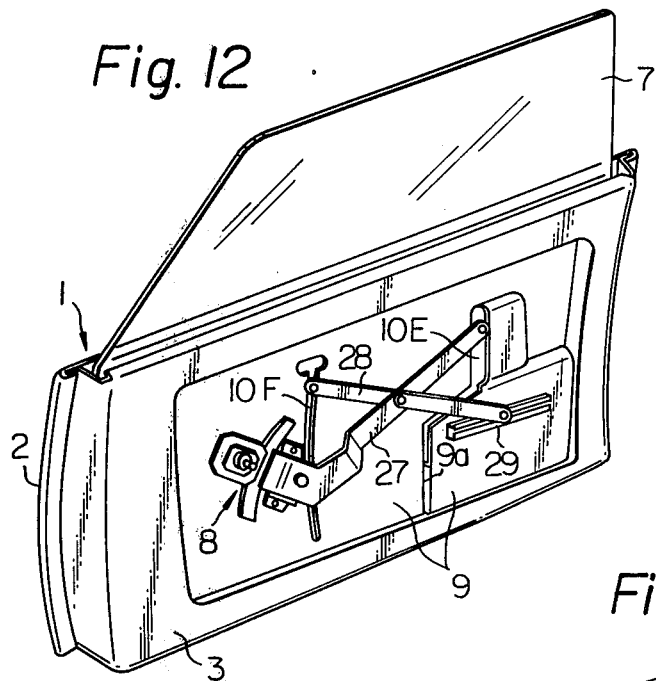
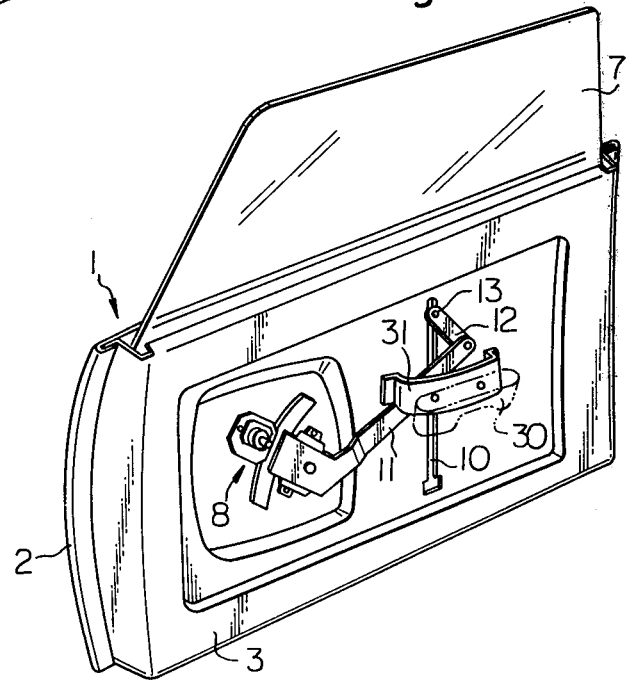

DOOR FOR VEHICLE, ESPECIALLY PASSENGER MOTOR VEHICLE

BACKGROUND OF THE INVENTION

The present invention relates to a door for vehicles, especially for passenger motor vehicles, which includes an outer sheet metal door panel and an inner sheet metal door panel and which is provided with a window regulator unit for moving a door glass between a raised position closing the window opening, and lowered position in which the door glass is stored in a storage cavity within the vehicle.

With the conventional door constructions, a window regulator unit is installed within a space between outer and inner door panels so that, upon installation of the window regulator unit, the window regulator unit must be mounted in a proper position within the space from the outside via a plurality of attachment openings formed through the inner door panel while manually holding the unit in the proper position via the attachment openings. Thus, the workability of the installation of the window regulator is bad and the provision of the attachment openings is responsible for a weakness in rigidity of the door, thus requiring some measure to compensate for the weakness.

SUMMARY OF THE INVENTION

An object of the invention is to provide a door for passenger motor vehicles, which is free from the above described drawbacks encountered in the conventional doors.

According to the present invention, there is provided a door for vehicles comprising: an outer door panel; an inner door panel attached to the outer door panel to form therebetween a space; a door glass which will be received within the space when it is lowered; guide means mounted within the space for guiding the door glass; the inner door panel being formed within an attachment portion which is recessed from the remaining portion and with a shoulder interconnecting the portions; the inner door panel being formed with a slit; a window regulator unit attached to the attachment portion and disposed on the outside of the inner door panel; a mechanical linkage including a window regulator arm of the window regulator unit and establishing operative connection between the window regulator unit and the door glass the mechanical linkage extending through the slit; and the slit having an elongate opening configured and arranged so as to allow movement of the mechanical linkage as the door is lowered.

BRIEF DESCRIPTION OF THE DRAWINGS

The invention will be described hereinafter in connection with the accompanying drawings, in which:

FIG. 3 is a perspective view showing a second embodiment;

FIG. 4 is a perspective view showing a third embodiment;

FIG. 7 is a perspective view showing a fourth embodiment;

FIG. 8 is an exploded view of a door glass and a guide rail used in FIG. 7;

FIG. 11A is a perspective view showing a sixth embodiment;

FIG. 11B is an exploded view of an attachment plate fixed to a door glass and a window regulator arm used in FIG. 11A;

FIG. 12 is a perspective view showing a seventh embodiment; and

FIG. 13 is a perspective view showing a modification of FIG. 1 embodiment.

DESCRIPTION OF THE PREFERRED EMBODIMENTS

Figure 1:
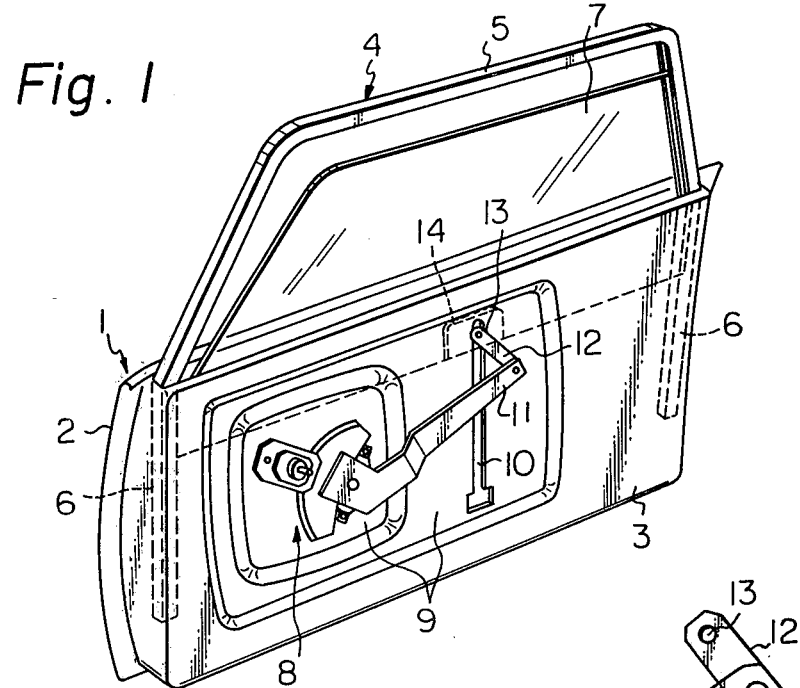
FIG. 1 is a perspective view of a door constructed in accordance with the invention.

Referring now to the drawings wherein like reference numerals are used throughout the various views to designate like parts, a door for a passenger motor vehicle, illustrated in a perspective view in FIG. 1 of the drawings, includes a door main body 1 which includes an outer sheet metal door panel 2 and an inner sheet metal door panel 3, a sash 4 which includes an upper sash section 5 extending upward from the door main body 1 and two lower sash sections 6 arranged within the door main body 1, and a door glass 7 guided by the sash 4 which can be lowered by a window regulator unit 8.

According to the invention, the inner panel 3 is recessed or formed with an attachment recess 9 within which the window regulator unit 8 will be attached from the inner side of the inner panel 3, the depth of the recessed portion being deep enough for the regulator unit 8 not to project through a plane formed by the remaining surface of the inner panel 3.

At the bottom of the attachment recess 9, the inner panel 3 is formed with a vertical straight slot 10 along which a connecting pin 13 is movable as the door glass 7 is lowered. The connecting pin 13 interconnects an attachment plate 14 fixed to the door glass 7 and a sub link 12 linked to a leading end of a window regulator arm 11. The door glass 7 is received within a space between the outer panel 2 and inner panel 3 when it is lowered, while, the door regulator unit 8, arm 11, and sub link 12 are attached to the side of the inner panel 6 which faces the passenger compartment.

Figure 2A:
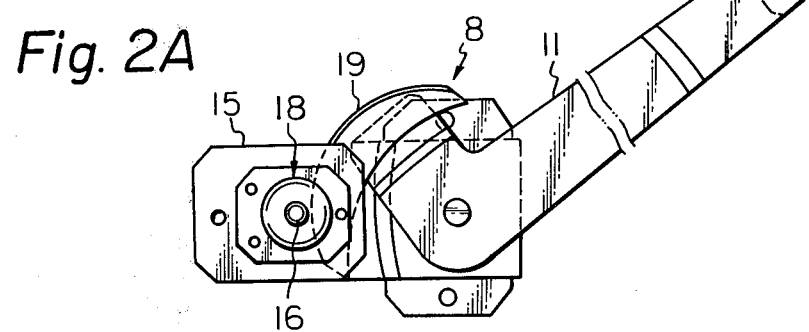
FIG. 2A is a side view of a window regulator unit used in FIG. 1.
Figure 2B:
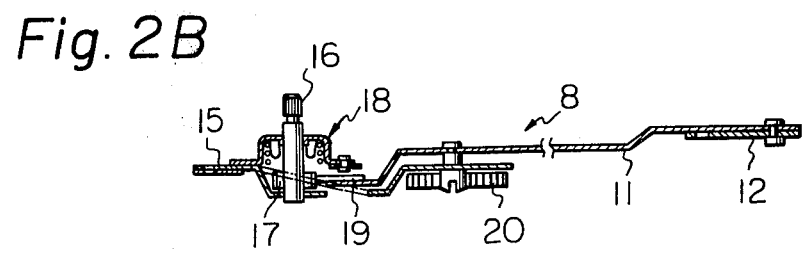
FIG. 2B is a top plan view of the window regulator unit of FIG. 2A.

As shown in FIGS. 2A and 2B, the window regulator unit 8 includes a base plate 15 and the arm 11 is arranged on the same side of the base plate 15 as the side toward which a rotary shaft 16 extends from the base plate 15, as different from the conventional arrangement in which a window regulator arm is arranged on the opposite side of the base plate 15 to the side toward which the rotary shaft 16 extends. A pinion 17 is coupled with the rotary shaft 16 and a sector gear 19 meshing with the pinion 17 is fixedly attached to the arm 11 so that rotation of the rotary shaft 16 will cause the arm 11 to swing causing the door glass 7 to be lifted or lowered. Designated by the reference numeral 20 is a spring which takes a load of the door glass 7.

The attachment recess 9 to which the window regulator unit 8 is attached will be concealed by a sealing screen (not shown) and then the inner panel 3 will be equipped with a door finisher (not shown) in the conventional manner.

Referring to the embodiment shown in FIG. 3, in which a window regulator arm 11 and a door glass 7 are directly connected thereby to eliminate the use of a sublink, an attachment plate 14, fixed to the door glass 7, is formed with a pin guide means 14a, in the form of a slit or rail, for receiving a guide roller (not shown) carried by a connecting pin 13 attached to the leading end of the window regulator arm 11 to allow relative movement of the pin 13 to the attachment plate 14. An inner door panel 3 is formed with a curved slit 10A which curves along the locus of the leading end portion of the arm 11 when the door glass 7 is lowered.

As will be readily understood from FIGS. 1, 2A, 2B and 3, the leading end of the arm 11 is disposed on the passenger compartment side of the inner panel 3 in the embodiments shown in these Figures. But the arm 11 may extend through the slit formed in the inner panel 3 into a space within the door, i.e., a space between the inner and outer panels 3 and 2, as shown in FIGS. 4 and 5.

Figure 5:
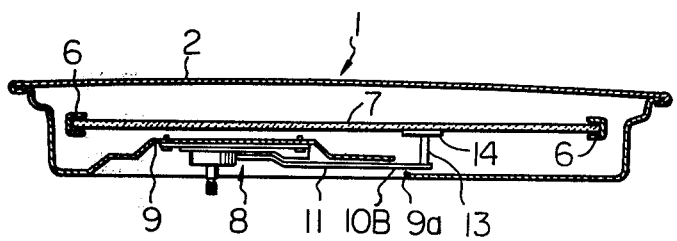
FIG. 5 is a section taken through line V—V of FIG. 4.
Figure 6:
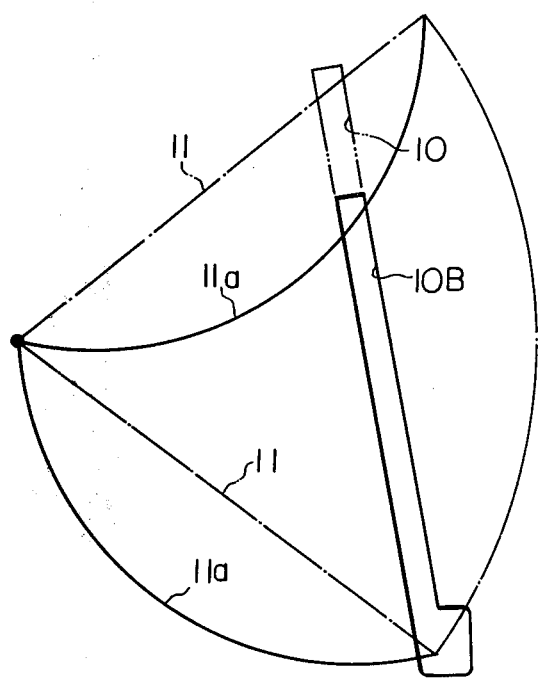
FIG. 6 is a diagram for explaining the embodiment shown in FIGS. 4 and 5.

Referring to the embodiment shown in FIGS. 4 and 5, in which a window regulator arm 11 extends through a slit 10B into a space between outer and inner door panels 2 and 3, the slit 10B is formed along a vertically extending side 9a of an attachment recess 9. The lower end portion of the slit 10B is disposed within an area within which the leading end portion of the window regulator arm 11 will be disposed when the door glass 7 is fully lowered, and is enlarged so as to give easy access to an attachment plate 14 and the arm 11 making the assembly easy. It will be noted that as the door glass 7 is lifted, the leading end portion of the arm 11 will plunge deeply into the space between the outer and inner panels 2 and 3. Because of this, the longitudinal length of a slit can be made short as compared to the embodiments shown in FIGS. 1 to 3. This is considered as an advantage in view of maintaining the rigidity of a door and of preventing water from entering the inner space of the door. The longitudinal length of the slit may be shortened further if a curved window regulator arm 11a as shown in FIG. 6 is used.

Figure 9:
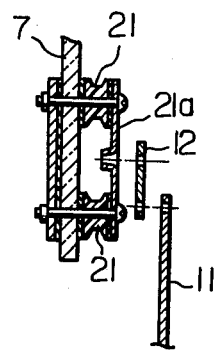
FIG. 9 is a section taken through the line IX—IX of FIG. 8.

FIG. 7 shows a sashless door embodying the present invention. In this embodiment, although a leading end portion of a window regulator arm 11 only is disposed in a space between outer and inner door panels 2 and 3, it is possible to arrange substantially all of a window regulator arm within the inner space between the outer and inner panels 2 and 3, if required. As shown in FIGS. 8 and 9, guide rollers 21 are mounted to the lower end portion of a door glass 7, while, a guide rail 22 for receiving the guide rollers 21 is installed within a space between the outer and inner panels 2 and 3 as the door glass 7 is lifted or lowered. An attachment plate 21a of the guide roller assembly is linked to the leading end portion of the arm 11 via a sublink 12.

Figure 10A:
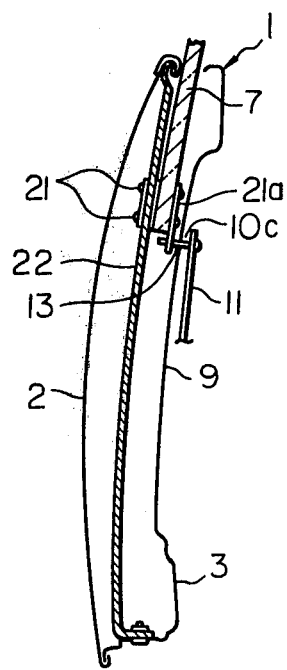
FIG. 10A is a vertical cross sectional view through a main body portion of a fifth embodiment of a door constructed in accordance with the invention.
Figure 10B:
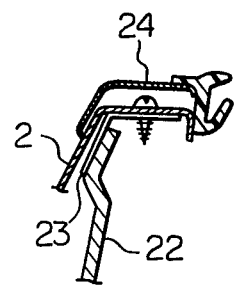
FIG. 10B is an enlarged partial view of FIG. 10A.

Although, in the just previously described embodiment, a space is required between an inner door panel and a door glass which space is large enough to accommodate a guide rail 22 and guide roller assembly 21 and 21a, such space may be eliminated if a guide rail and a guide roller assembly is arranged within a space available between a door glass and an outer door panel as shown in FIGS. 10A and 10B. As shown in FIG. 10A, an attachment plate 21a fixed to a lower end portion on the inner surface of a door glass 7 and to this attachment plate 21a a leading end portion of a window regulator arm 11 is directly connected in the same manner as shown in FIG. 4 or connected through a sublink (not shown) in the same manner as shown in FIGS. 7 and 9. With the arrangement shown in FIGS. 10A and 10B, a space available between the door glass 7 and the outer panel 2 can be effectively used and the thickness of the body portion of the door can be reduced so that the effective space of the passenger compartment will be enlarged. The guide rail 22 is arranged with its lower end fixedly attached to a lower bent end portion of an inner door panel 3 by a suitable fixer, such as a bolt, as shown in FIG. 10A. A suitable bracket 23 is securely attached to the upper end portion of the guide rail 22, such as by welding, and the bracket 23 is fixedly attached to an upper waist portion of the outer door panel 2 such as by a bolt, as shown in FIG. 10B. The bolt for attaching the bracket 23 to the outer panel 2 is concealed by a door waist moulding 24.

Although, in any one of the previous embodiments, a slit is formed at its lower end with an enlarged opening for ease of work, in assembly, upon establishing the operative connection between a leading end portion of a window regulator arm and an attachment plate on a door glass, the provision of such enlarged opening may be eliminated and the length and width of the slit can be reduced if another opening of the same purpose as the enlarged opening is formed within a different area on an inner door panel from the area where the slit is formed, as shown in FIG. 11A.

Referring to the embodiment shown in FIG. 11A and 11B, an attachment plate 21a of a guide roller assembly fixedly attached to a door glass 7 is formed with a suitable guide 24, which takes the form of a guide rail, while, a roller 25 received by the guide rail 24 is attached to a leading end portion of a window regulator arm 11. With the slidable connection between the arm 11 and the guide roller assembly, the provision of a sublink has been eliminated. An inner door panel 3 is formed with an attachment opening 26 for ease of work while assembling the arm 11 with the attachment plate 21a. With the construction and arrangement shown in FIGS. 11A and 11B, since it is not necessary for the leading end portion of the window regulator arm 11 to be exposed to the outside through a slit 10D, the arm 11 is arranged with its leading end portion kept plunging deeply into the space between the outer and inner panels 2 and 3 through the slit 10D and thus the longitudinal length of the slit 10D can be reduced. Since the size of the attachment opening 26 is not so large, the provision of the opening 26 will not cause a reduction in the rigidity of the door.

Referring to the embodiment shown in FIG. 12, in which, as a window regulator unit, a so-called X arm type window regulator is employed instead of a single arm type used in the previously described embodiments, the invention is embodied in a sashless door although the same may be embodied in a door with a sash. A leading end portion of a main arm 27 is slidably engaged by a guide rail (not shown) attached to a lower end portion of a door glass 7, the guide rail running to the left and right, as viewed in this Figure. Similarly an upper end of a subarm 28 is slidably engaged by the guide rail and a lower end thereof is slidably engaged by a guide rail 29 securely attached to a lower end portion of an inner door panel 3.

The inner panel 3 is formed with slits 10E and 10F for allowing the movement of the main arm 27 and the movement of the subarm 28, respectively. The slit 10E is formed within a vertically extending side 9a of an attachment recess 9 so as to allow the main arm 27 to move as its leading end moves along the guide rail fixedly attached to the door glass 7. The width of the slit 10E is such that as the door glass 7 is lowered the leading end of the main arm 27 will plunge through the slit 10E into the space between outer and inner door panels 2 and 3. The slit 10F is curved so as to allow the leading end of the subarm 28 to move as the door glass 7 is lowered.

If desired, a loss in the rigidity of provision of a slit 10 in an inner door panel 3 may be compensated for by an attachment bracket 31, as shown in FIG. 13, to which an arm rest 30 will be attached, the attachment bracket 31 being mounted to the inner panel 3 as to ride over the slit 10 so as not to interfere with movement of a window regulator arm 11.

It will be appreciated that the provision of an attachment recess in an inner door panel will make it easy to install a window regulator unit, thus reducing work or cost required for installing the window regulator unit.

What is claimed is:

1. A door for vehicles comprising:
   an outer door panel;
   an inner door panel attached to said outer door panel to form therebetween a space;
   a door glass which will be received within said space when it is lowered;
   guide means mounted within said space for guiding said door glass;
   said inner door panel being formed with an attachment portion which is recessed from the remaining portion;
   said inner door panel being formed with a slit;
   a window regulator unit attached to said attachment portion and disposed on the outside of said inner door panel;
   a mechanical linkage including a window regulator arm of said window regulator unit and establishing operative connection between said window regulator unit and said window glass, said mechanical linkage extending through said slit; and
   said slit having an elongate opening configured and arranged so as to allow movement of said mechanical linkage as said door glass is lowered.

2. A door as claimed in claim 1, in which said slit has an enlarged opening joined to said elongate opening, said enlarged opening being configured and arranged so as to give easy access to a connection between said door glass and said mechanical linkage when said door glass is lowered.

3. A door as claimed in claim 1, in which said inner door panel is formed with an opening configured and arranged so as to give easy access to a connection between said door glass and said mechanical linkage when said door glass is lowered, said opening being separated from said slit.

4. A door as claimed in claim 1, further comprising a bracket member, to which an armrest is adapted to be attached, fixedly attached to said inner door panel member so as to ride over said slit in such a manner as to compensate for a reduction in rigidity of the inner door panel member which is attributed to the provision of said slit.

5. A door as claimed in claim 1, in which said guide means is disposed within an area between said outer door panel and said door glass, as said door glass is lowered.

6. A door as claimed in claim 1, in which said slit curves along the locus of a leading end of said window regulator arm when said door glass is lowered.

7. A door as claimed in claim 1 or claim 6, in which said window regulator arm plunges deeply into said space through said slit as said door glass is raised.

8. A door as claimed in claim 7, in which said window regulator arm unit has its leading end portion curved upwardly.

* * * * *